No. 884,239. PATENTED APR. 7, 1908.
C. W. TAYLOR.
COMBINED GRAPHOPHONE AND PICTURE EXHIBITOR.
APPLICATION FILED JAN. 25, 1904. RENEWED DEC. 21, 1905.
5 SHEETS—SHEET 1.
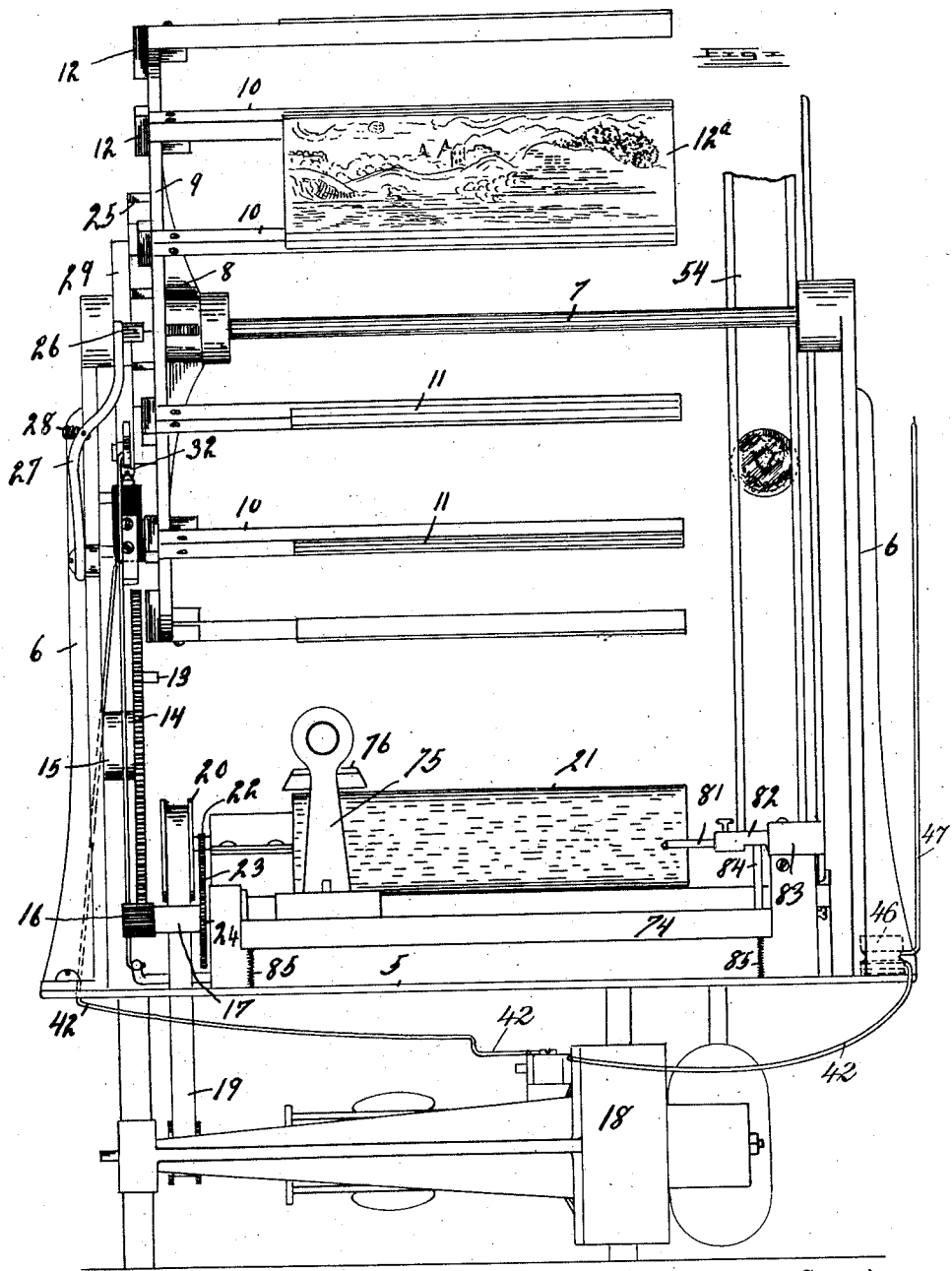
Witnesses:
J. G. Howlett.
E. G. Wright
Inventor
Charles W. Taylor.
By his Attorneys
E. O. Wheeler & Co.

No. 884,239.
PATENTED APR. 7, 1908.
C. W. TAYLOR.
COMBINED GRAPHOPHONE AND PICTURE EXHIBITOR.
APPLICATION FILED JAN. 25, 1904. RENEWED DEC. 21, 1905.
5 SHEETS—SHEET 2.
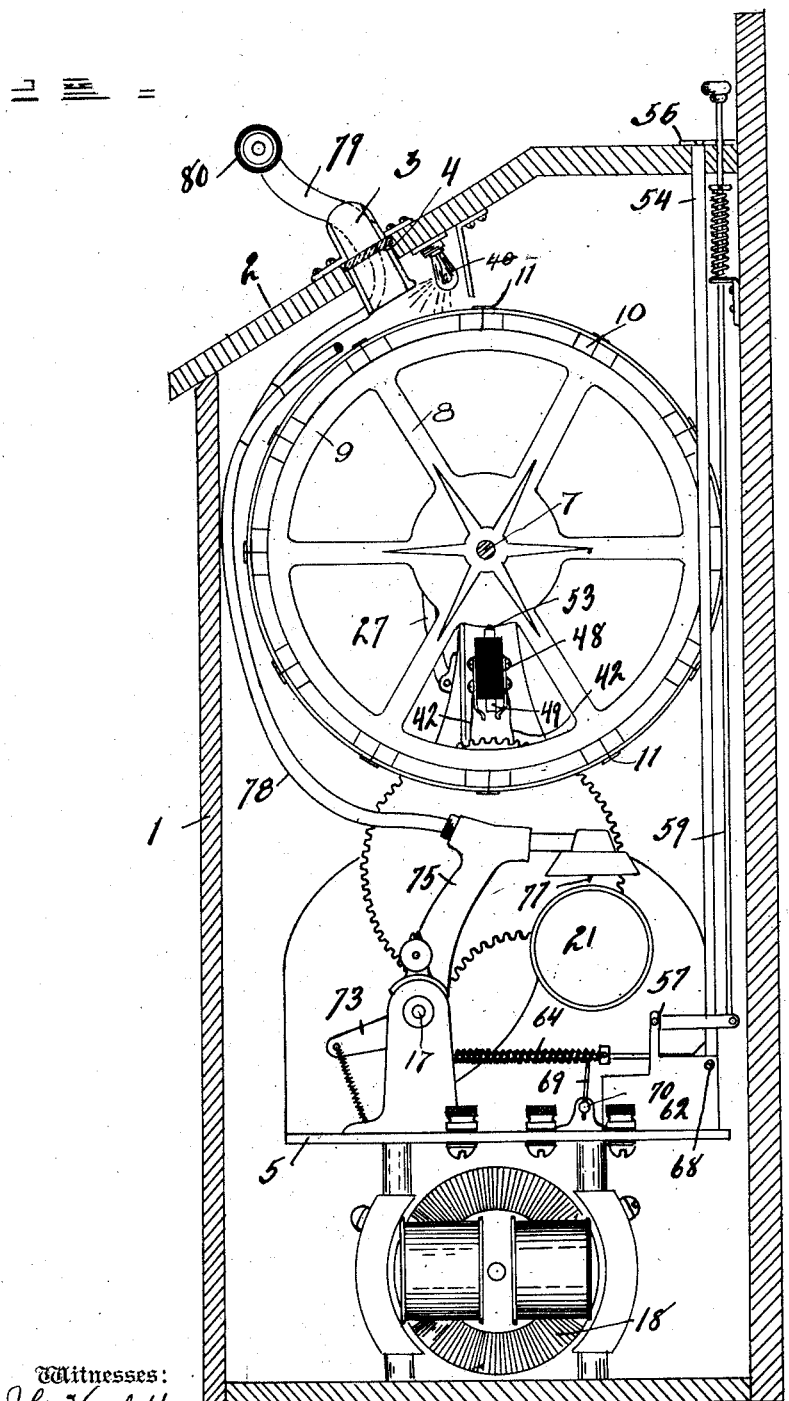

No. 884,239. PATENTED APR. 7, 1908.
C. W. TAYLOR.
COMBINED GRAPHOPHONE AND PICTURE EXHIBITOR.
APPLICATION FILED JAN. 25, 1904. RENEWED DEC. 21, 1905.
5 SHEETS—SHEET 3.
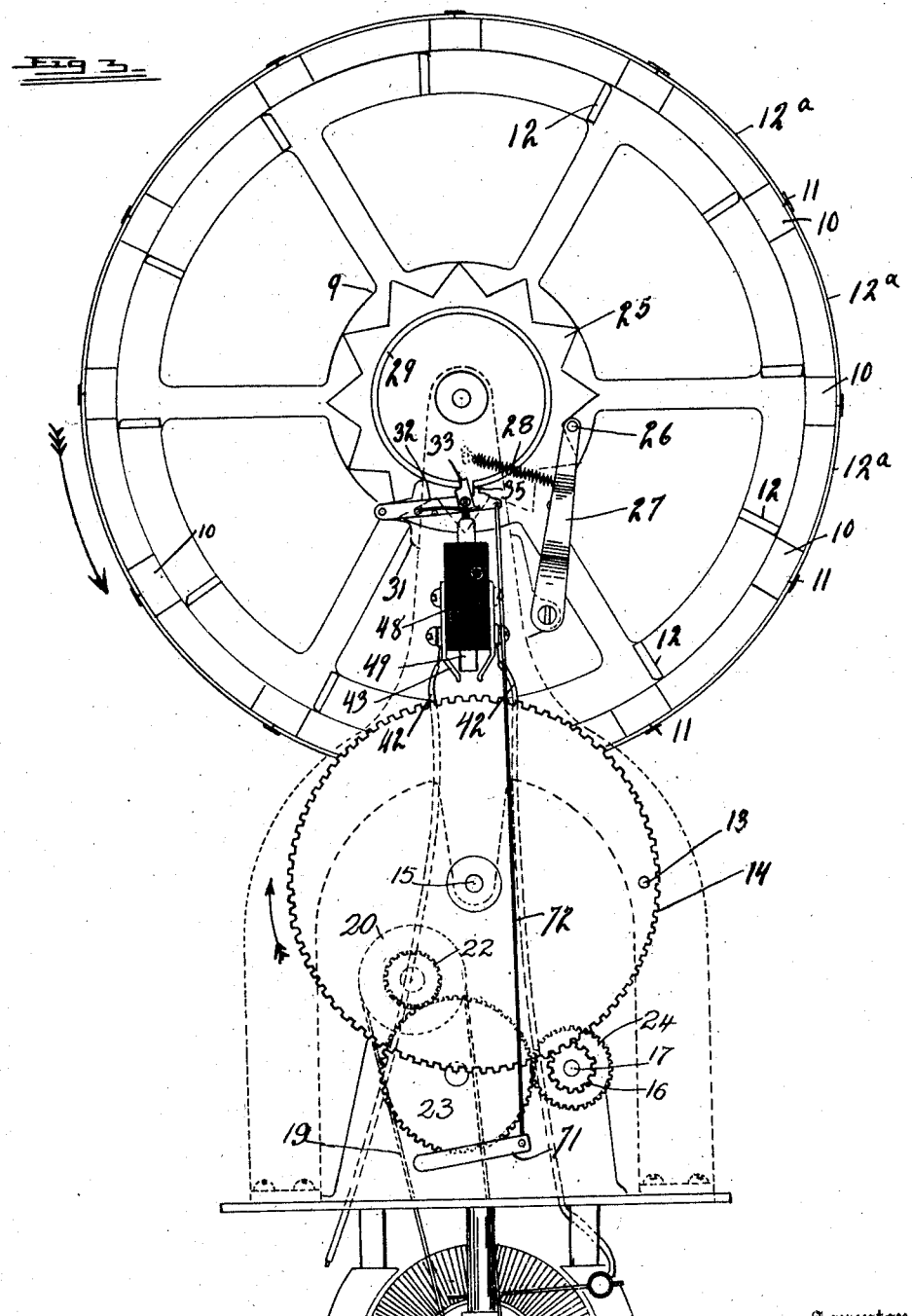

No. 884,239. PATENTED APR. 7, 1908.
C. W. TAYLOR.
COMBINED GRAPHOPHONE AND PICTURE EXHIBITOR.
APPLICATION FILED JAN. 25, 1904. RENEWED DEC. 21, 1905.
5 SHEETS—SHEET 4.
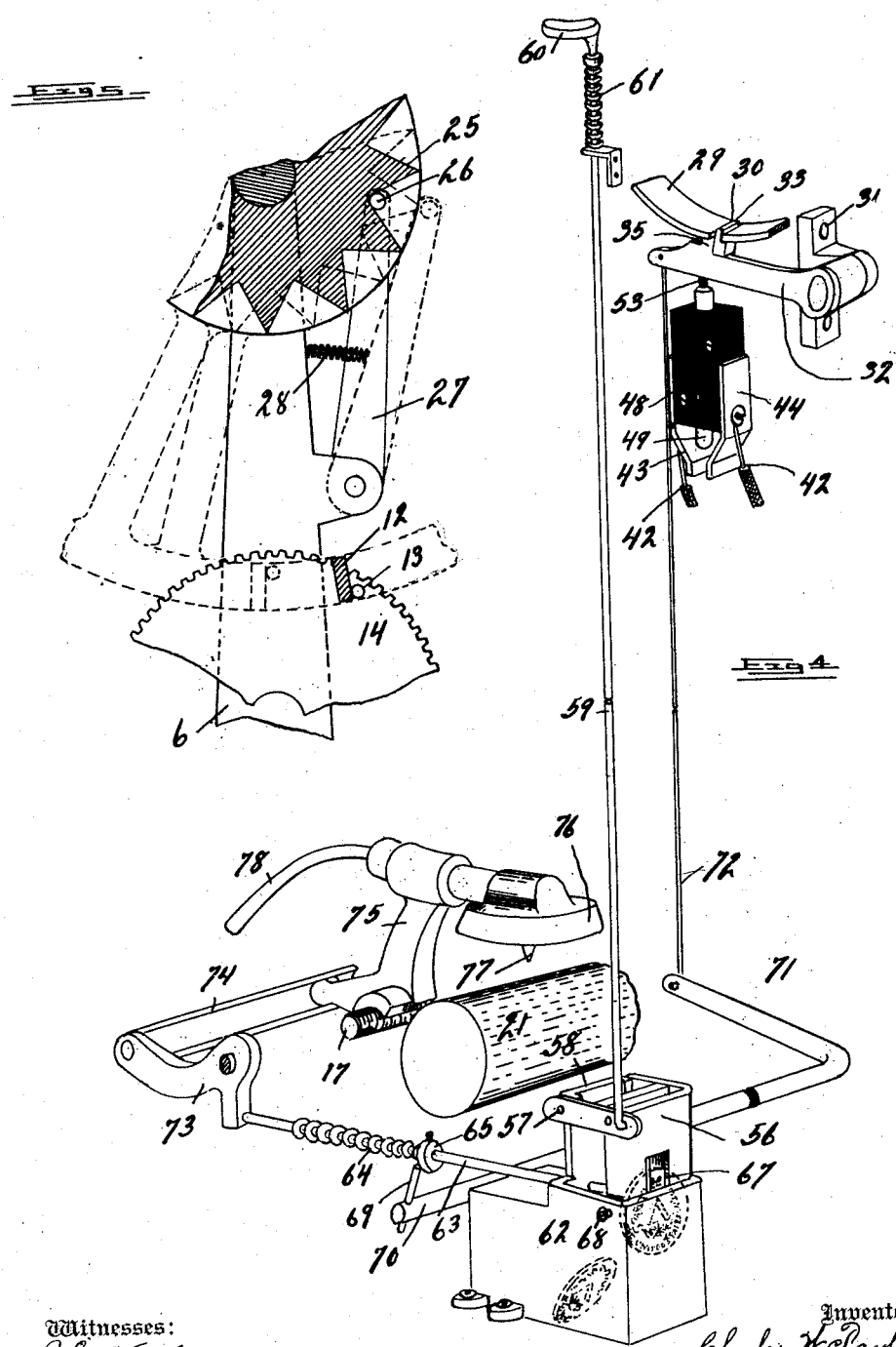

No. 884,239. PATENTED APR. 7, 1908.
C. W. TAYLOR.
COMBINED GRAPHOPHONE AND PICTURE EXHIBITOR.
APPLICATION FILED JAN. 25, 1904. RENEWED DEC. 21, 1905.
5 SHEETS—SHEET 5.
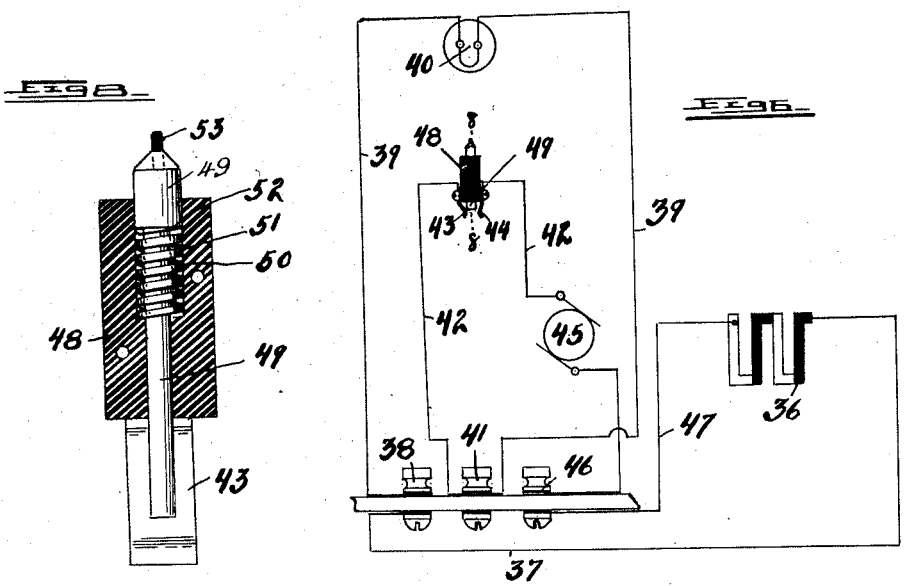
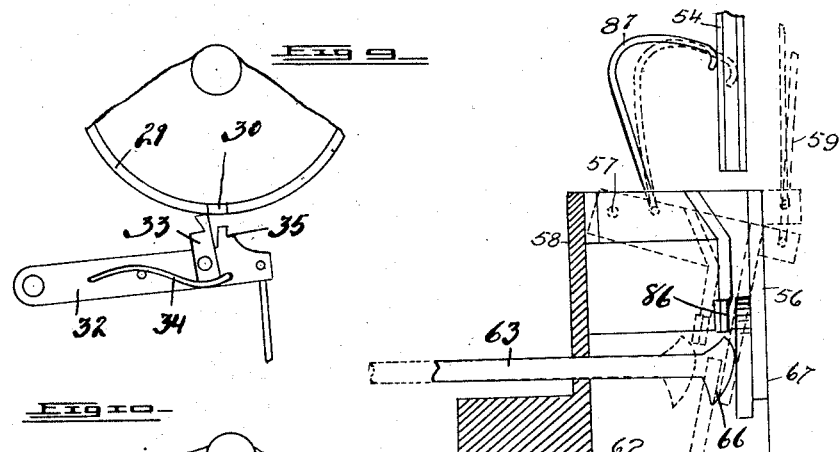
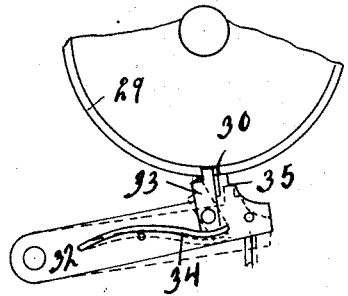
Witnesses:
J. G. Howlett.
P. S. Wright.
Inventor
Charles W. Taylor
By His Attorneys
E. O. Wheeler & Co.

UNITED STATES PATENT OFFICE.

CHARLES W. TAYLOR, OF DETROIT, MICHIGAN, ASSIGNOR, BY MESNE ASSIGNMENTS, TO EUGENE F. GLOCK, OF DETROIT, MICHIGAN.

COMBINED GRAPHOPHONE AND PICTURE-EXHIBITOR.

No. 884,239.  Specification of Letters Patent.  Patented April 7, 1908.

Application filed January 25, 1904, Serial No. 190,479. Renewed December 21, 1905. Serial No. 292,737.

*To all whom it may concern:*

Be it known that I, CHARLES W. TAYLOR, a citizen of the United States, residing at Detroit, in the county of Wayne, State of Michigan, have invented certain new and useful Improvements in a Combined Graphophone and Picture-Exhibitor; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a graphophone and picture exhibitor, and consists in the construction and arrangement of parts hereinafter fully set forth and pointed out particularly in the claims.

The primary object of the invention is to provide in connection with a graphophone, means for illustrating in a series of views, the subject matter of the record as the record is reproduced, enabling a song, musical composition or lecture to be illustrated by appropriate views while being repeated or reproduced through the medium of the graphophone.

A further object is to provide suitable mechanism adapted through its operation to simultaneously start the graphophone and the picture exhibitor.

A further object is to provide for automatically opening the circuit of the lamp which illuminates the pictures after all of the pictures have been exhibited, and locking the pictures against movement until they are started in conjunction with the graphophone and the simultaneous illumination of the case in which they are exhibited.

The above objects are attained by the mechanism illustrated in the accompanying drawings, in which:

Figure 1 is a side elevation of a machine embodying my invention. Fig. 2 is a vertical transverse section through the case in which the mechanism is mounted, showing the mechanism therein in end elevation. Fig. 3 is an elevation of the opposite end of the machine, to that shown in Fig. 2, the case being removed and a portion of the supporting frame being shown in dotted lines. Fig. 4 is a fragmentary view in perspective, of the coin controlled mechanism, the circuit opener and closer operated thereby, and a portion of the operative parts of the graphophone controlled by the operation of the coin mechanism. Fig. 5 is a fragmentary view, partly in section, of a portion of the mechanism for controlling the operation of the reel which carries the pictures. Fig. 6 is a diagrammatical view of the circuit including the generator, the motor, the light and the circuit opener and closer. Fig. 7 is an enlarged sectional view through a portion of the coin mechanism, showing by dotted lines the movement thereof. Fig. 8 is an enlarged sectional view as on dotted line 8—8 of Fig. 6. Fig. 9 is a fragmentary view in elevation of the spring actuated dog adapted to lock and release the reel containing the pictures. Fig. 10 is an illustration of the parts shown in Fig. 9, showing by dotted lines the movement thereof.

Referring to the characters of reference, 1 designates a suitable case in which the operative mechanism is mounted and which is provided with an inclined top 2, in which is a sight-opening surrounded by an eye shield 3, said sight-opening having therein a suitable lens 4. Placed within the case at the bottom thereof is an ordinary graphophone, and mounted upon the metal base 5 of said graphophone at opposite ends thereof, are the standards 6 in the upper ends of which is journaled a shaft 7. Fixed on said shaft at one end thereof is a spider 8 upon whose outer rim 9 are mounted the laterally projecting arms 10 which extend parallel with the shaft 7. Secured to the outer face of said arms and extending parallel therewith are the metal retaining strips 11 which form guides between which a card 12ª containing a picture, may be slipped so as to extend across said arms, as shown in Fig. 1, the space between each pair of arms serving to contain a picture, and there being as many pictures upon the reel as desired, the number of pictures being determined by the length of the record to be illustrated.

Upon the outer face of the rim 9 of the spider, are a number of lugs 12 projecting laterally therefrom. These lugs are adapted to be successively engaged by a pin 13 on the inner face of a large gear wheel 14 journaled at 15 to one of the standards 6, and meshing with a pinion 16 on the end of the shaft 17 of the carriage of the graphophone, said shaft 17 receiving its motion from the shaft of the motor 18 through the medium of the belt 19 which passes over the pulley 20 on the shaft of the record cylinder 21 upon which is a pinion 22 which meshes with a transmitting gear 23 that in turn meshes with the gear 24 on said shaft 17, whereby the motor not only drives the graphophone but the reel as well upon which are the pictures to be exhibited.

The distance which the reel is turned by each successive engagement of the pin 13 of the gear wheel 14 with the lugs 12, is determined by the star points 25 formed upon the spider concentric with its axis, and describing a zig-zag circular track over which the anti-friction roller 26 mounted on the end of the pivoted arm 27 is adapted to roll, said arm being restrained by the coiled spring 28. As the spider is revolved by the engagement of the pin 13 on the gear 14 with the lugs 12, the anti-friction roller in the spring restrained arm is caused to ride over the points 25. As said roller rides up the incline on one side of each successive pin, the spring 28 is expanded so that when the roller passes the apex of the star point, it is drawn by said spring forcibly against the opposite inclined face thereof, accelerating the further movement of the reel until the roller reaches the base of the incline, when the movement of the reel is arrested because of the tension of said spring, until one of the lugs thereon is again encountered by the pin 13. By this arrangement, the reel is prevented from being turned farther than is desired, and the latter part of its movement is quickened so that a picture is more quickly brought into view and remains longer at rest, the arrangement being such that a succeeding picture is brought in line with the sight opening in the case by each operation of the reel through the engagement of the pin 13 with one of the lugs 12.

For the purpose of arresting the reel after it has made one complete revolution, there is employed upon the face of the spider concentric with the axis thereof, a laterally projecting flange or ring 29 having formed therein a notch 30. Located below said flange and pivoted to a bracket 31 mounted on the fixed part of the frame, is an arm 32 to which is pivoted a dog 33 backed by the spring 34. This dog is pivoted to the face of the arm and is shouldered to extend across the upper edge thereof, as shown in Fig. 4, being supported by a lug 35 on the arm which serves as a stop therefor when the dog enters the aperture 30 in arresting the movement of the reel. To disengage the dog from said aperture to allow the reel to rotate, the arm 32 is depressed, by means hereinafter explained, sufficiently to retract the dog from said notch or aperture, when the spring 34 bearing upon the end of said dog, will turn said dog upon its pivot sufficiently to cause its upper end to engage the face of the ring or flange 29, thereby leaving the reel free to revolve until by a complete revolution thereof, the notch 30 is again brought into alinement with said dog, when the arm 32 will be forced upwardly, as hereinafter explained, and the dog caused to enter said notch and arrest the rotation of the reel.

The lamp which illuminates the pictures and the circuit opener and closer which controls the lamp and motor circuit, are in series with the motor and the parts are so arranged that the operation of withdrawing the dog 33 from the notch 30 to release the reel, also closes the circuit through the motor and light, thereby simultaneously starting the graphophone and reel by the operation of unlocking the reel, and by the same means, when the reel has made a complete revolution, the light and motor circuit is opened simultaneously with the operation which locks the reel from further rotation.

The arrangement of the circuit is shown in Fig. 6 in which 36 designates the generator from which leads one of the service wires 37 to binding post 38 from which leads the conductor wire 39 to the lamp 40 and thence to the binding post 41; from said binding post leads the conductor wire 42 to the spring terminal 43 of the circuit opener and closer. From the pivoted spring terminal 44, said wire 42 leads to the motor 45 and thence to the binding post 46, the circuit being completed from said binding post through line 47. Seated in a block of insulating material 48 is the conductor pin 49, which, when forced downwardly between the points of the spring terminals 43 and 44, closes the circuit at that point thereby bringing the lamp and motor into service. When the pin is raised from between said spring terminals, the circuit is broken, thereby cutting out the lamp and motor. On referring to Fig. 8, it will be seen that the conductor pin 49 is seated in the socket 50 in which is located a coiled spring 51 which surrounds said pin and engages the shoulder 52 thereon, whereby the pin is normally held in the raised position, leaving the circuit open between the spring terminals 43 and 44. The block of insulation 48 in which said pin is supported and to which said spring terminals are attached is so positioned as to bring the upper end of said pin which is provided with the tip 53 of insulating material, directly under the arm 32 carrying the dog 33, as clearly shown in Fig. 4, whereby when said arm is depressed to carry the locking dog from the notch in the flange 29 of the reel, said pin 49 will be forced downward by said arm, sufficiently to carry its lower end into electrical contact with the spring terminals 43 and 44, thereby closing the circuit as before described, in which position said pin is maintained while said dog remains in contact with the periphery of the flange or ring 29 during the rotation of the reel. When the reel has made a complete revolution, and the notch 30 is again brought into alinement with the dog, said dog will be forced into said notch by the spring 51 which will raise the pin 49 against the arm 32, thereby withdrawing the lower end of the pin from between the spring terminals by the same operation which locks the reel and simultaneously cutting out the lamp and motor.

To provide for operating the machine through the medium of coin controlled mechanism, whereby the machine may be put in operation after a coin has been inserted in a slot in the case, there is employed a coin chute 54 which communicates with a slotted plate 55 on the top of the machine and leads downwardly to a receiving jaw 56 with which the lower end of said chute communicates, and which is adapted to arrest the coin, as shown in Fig. 4, when in its normal position. Said receiving jaw is hinged at 57 to a support 58 and is adapted to swing downwardly and inwardly upon said pivot. Attached to said jaw is a rod 59 which passes upwardly through the top of the case and has a button 60 upon its upper end. Embracing said rod is a retracting spring 61 which raises it after being depressed. Passing through the upper portion of the housing 62 into which the receiving jaw swings, is a reciprocatory rod 63 having thereon a returning spring 64 and carrying a collar 65. Upon the outer end of the rod 63 is a head 66 (see Fig. 7) which stands in line with the slotted opening 67 in the jaw 56 so that when said jaw is swung inwardly without a coin therein, the head will enter the slot 67 and no movement will be imparted to the rod 63. The spring 61 normally holds the jaw 56 in the position shown in Fig. 4, so that when a coin is dropped into the chute, it is directed into said jaw and is arrested therein by the inner end of the set screw 68 which passes through the housing 62 in the path of the coin, thereby preventing the coin from passing through the jaw and holding it interposed between the face of the jaw and the head 66, so that as the jaw is swung inwardly through the operation of depressing the rod 59, the coin is carried against the head 66 whereby the rod 63 is moved longitudinally causing the collar 65 thereon to engage the pin 69 projecting from the end of the rock shaft 70 which is suitably supported and is provided at its opposite end with the crank arm 71, to the end of which is pivoted the lower end of the rod 72, whose upper end is pivoted to the arm 32, thereby depressing said arm to withdraw the dog 33 from the notch in the flange of the reel and carry the pin 49 into contact with the spring terminals 43 and 44 of the circuit, whereby said circuit is closed and the machine is placed in operation as before described. By the same movement of the rod 63 which actuates the rock shaft 70 to release the reel and close the circuit, the inner end of said rod is carried into contact with the bell-crank lever 73 to one end of which is pivoted the cross bar 74 which engages a projection on the arm 75 movably mounted upon the carriage of the graphophone and carrying the transmitting diaphragm 76 with its record tracing point 77. The movement of the bell-crank lever through the action of said rod 63 raises the cross bar 74 and rocks the arm 75 to bring the pin 77 into contact with the record, at the same time a half nut in the sleeve of said arm, engages the thread of the shaft 17 so as to cause the arm carrying the transmitting diaphragm to travel along said shaft so that the record upon the cylinder 21 may be reproduced in a manner common to machines of this character as well understood in the art. Connected to the transmitting diaphragm is the ordinary listening tube 78 which passes upwardly and terminates in branches 79 which extend through the top of the case and carry the funnel ends 80 which are disposed conveniently to the ears of the operator when the head is in position to look through the sight opening in the case as will be well understood. It will now be apparent that when a coin is inserted and the rod 59 depressed, the operative parts will be actuated to simultaneously close the electric circuit; to release the reel and place the transmitter in position to reproduce the record, thereby conveying to the ears of the operator, the reproduced song, lecture, or speech which the record may contain, and at the same time presenting to the eyes of the operator the pictures in illustration of the subject matter of the record, or of an interesting and entertaining character. When the tracing style of the transmitter shall have reached the end of the record, the arm 75 engages a trigger 81 mounted at the end of the transmitter carriage and supported in a spring actuated stud 82 slidable in a sleeve 83, said stud being adapted, when the machine is in operation, to engage a projection 84 on the arm of the cross bar 74 and lock said bar raised against the action of the springs 85. The contact of the arm 75 with said pin, however, disengages the projection on the arm of the cross bar from said stud and allows the spring 85 to draw the cross bar 74 down, thereby raising the tracing point of the transmitter from the record and at the same time carrying the half-nut in the sleeve of the arm 75 from engagement with the screw of the shaft 17, when a spring, not shown, will retract said arm to return the reproducer to the initial end of the record, all of which matter is common in graphophones and need not be more particularly described.

At the time the reproducer reaches the end of the record and is automatically returned, as before described, the reel carrying the pictures will have made a complete revolution, bringing the slot or notch 30 in the flange or ring 29 of the reel to again register with the dog 33, when said dog will enter said notch to lock said reel and at the same time allow the pin 49 to be raised by its spring to open the circuit cutting out the motor and the lamp, whereby the operation of the machine is stopped and the parts are restored to the position for a succeeding operation.

The screw 68 in the side of the casing 62 (see Fig. 4) which arrests the passage of the coin through the jaw 65 and serves to regulate the size of the coin which may be used to operate the machine, is in the path of the coin only when the jaw is in the position shown in said view. When the jaw is swung inwardly by depressing the rod 59, the coin is carried away from said screw so that it is free to drop through said jaw after the pressure of the head 66 against the coin is removed. As the coin jaw swings downwardly, the cross bar 86 moves downward behind the head 66 and takes the thrust of said head from the coin, as shown by dotted lines in Fig. 7, permitting the coin to drop from the jaw as said jaw continues its inward movement in operating the rod 63.

Attached to the pivoted coin receiving jaw 56 is a curved spring arm 87 the inner end of which is adapted to enter the coin chute when said jaw is swung inwardly to arrest a second coin should it be introduced into the chute before said jaw has returned into position to properly receive it.

Having thus fully set forth my invention, what I claim as new and desire to secure by Letters Patent is:—

1. The combination with a graphophone and its motor, of a movable carrier containing a series of pictures, a light and a circuit closer for said light in circuit with said motor, said carrier being operated from said motor in a manner to impart an intermittent movement thereto, means for locking the carrier against rotation at the completion of its movement, and means for unlocking said carrier operated simultaneously with the starting of the motor and the actuation of said circuit closer.

2. The combination with a graphophone, of a normally open electric circuit, including the motor of said graphophone, a lamp and a circuit opener and closer, a movable picture carrier adapted to contain a series of pictures, means for locking said carrier against movement, said locking means being connected with said circuit opener and closer, whereby by the closing of the circuit said carrier is unlocked simultaneously with the lighting of the lamp and the starting of the motor of the graphophone.

3. The combination with a graphophone, a movable carrier adapted to contain a series of pictures, a lamp for illuminating said pictures, a motor for driving the graphophone, means connected with the shaft of said motor for operating said carrier, a catch for locking said carrier against movement, a normally open electric circuit including said motor, light and a circuit opener and closer, means associated with said circuit opener and closer for unlocking the catch of said carrier, means for simultaneously operating the circuit closer, and placing the graphophone in operative position, whereby said carrier is unlocked, the graphophone is started and said lamp lighted, and means for automatically opening said circuit at the completion of the exhibition of the pictures.

4. The combination with a graphophone, of a movable carrier adapted to contain a series of pictures, means for imparting movement to said carrier simultaneously with the operation of the graphophone, an electric lamp for illuminating said pictures, a normally open electric circuit including said lamp, a source of energy, and a circuit opener and closer, a catch for locking and releasing said carrier connected with and operated by the movement of said circuit opener and closer, mechanism connected with said catch, whereby it may be actuated to release said carriage and simultaneously close the circuit, and means for automatically locking said carriage and opening said circuit.

In testimony whereof, I sign this specification in the presence of two witnesses.

CHARLES W. TAYLOR.

Witnesses:
E. S. WHEELER,
I. G. HOWLETT.